L. E. UNDERWOOD.
DYNAMO.
APPLICATION FILED JAN. 14, 1909.

1,003,955.

Patented Sept. 19, 1911.
2 SHEETS—SHEET 1.

Witnesses:

Inventor:
Louis E. Underwood,
by Att'y.

L. E. UNDERWOOD.
DYNAMO.
APPLICATION FILED JAN. 14, 1909.

1,003,955.

Patented Sept. 19, 1911.
2 SHEETS—SHEET 2.

Witnesses:
George W. Tilden
J. Ellis Eler.

Inventor:
Louis E. Underwood,
by Albert G. Davis
Att'y

UNITED STATES PATENT OFFICE.

LOUIS E. UNDERWOOD, OF LYNN, MASSACHUSETTS, ASSIGNOR TO GENERAL ELECTRIC COMPANY, A CORPORATION OF NEW YORK.

DYNAMO.

1,003,955.  Specification of Letters Patent.  Patented Sept. 19, 1911.

Application filed January 14, 1909.  Serial No. 472,245.

*To all whom it may concern:*

Be it known that I, LOUIS E. UNDERWOOD, a citizen of the United States, residing at Lynn, in the county of Essex, State of Massachusetts, have invented certain new and useful Improvements in Dynamos, of which the following is a specification.

My invention relates to dynamos, and more particularly to dynamos which are used to produce a constant output, and consists in a certain arrangement of the field and connections on the armature for producing the required regulation. I accomplish this regulation by providing on the armature connections which revolve with it and produce what may be called a polyphase short-circuit upon the armature, and hence a field which will be angularly displaced from the initial exciting field. I provide commutator brushes which are so positioned as to produce an armature reaction which will be in a direction parallel to and opposing that of the initial exciting field. I may also, if I so desire, provide a field displaced from the initial exciting field, in addition to it, the field produced by the polyphase short-circuit on the armature, and the field due to the armature reaction, and whose position depends upon that of the commutator brushes. The intensities and the resultants of these fields may be so proportioned that a dynamo built, in accordance with my invention, may be made to give a constant output, or substantially a constant current independent of the speed at which the armature revolves.

For a further understanding of my invention, reference may be had to the accompanying drawings, where—

Figure 1:
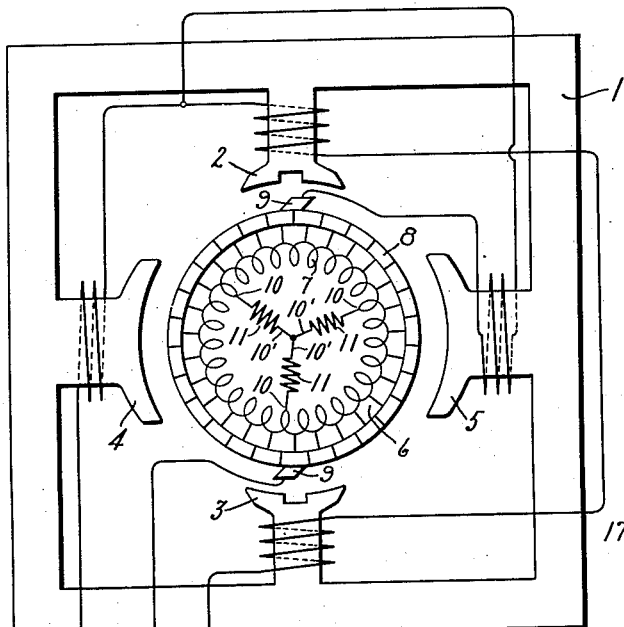
Figure 2:
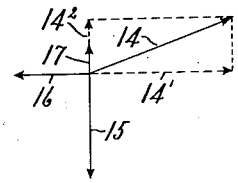
Figure 4:
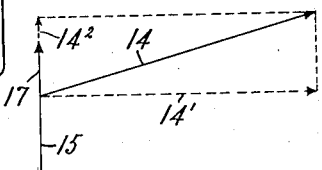
Figure 3:
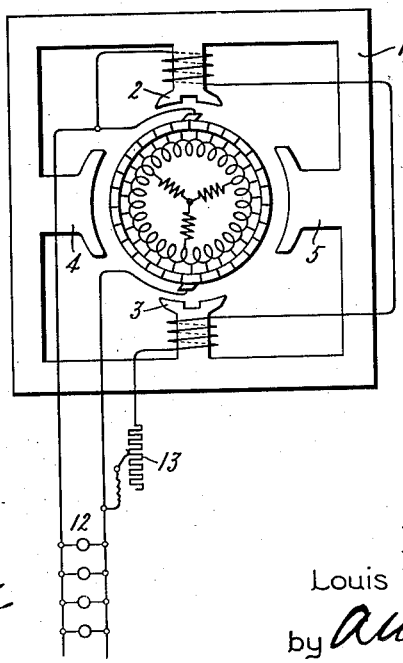
Figure 5:
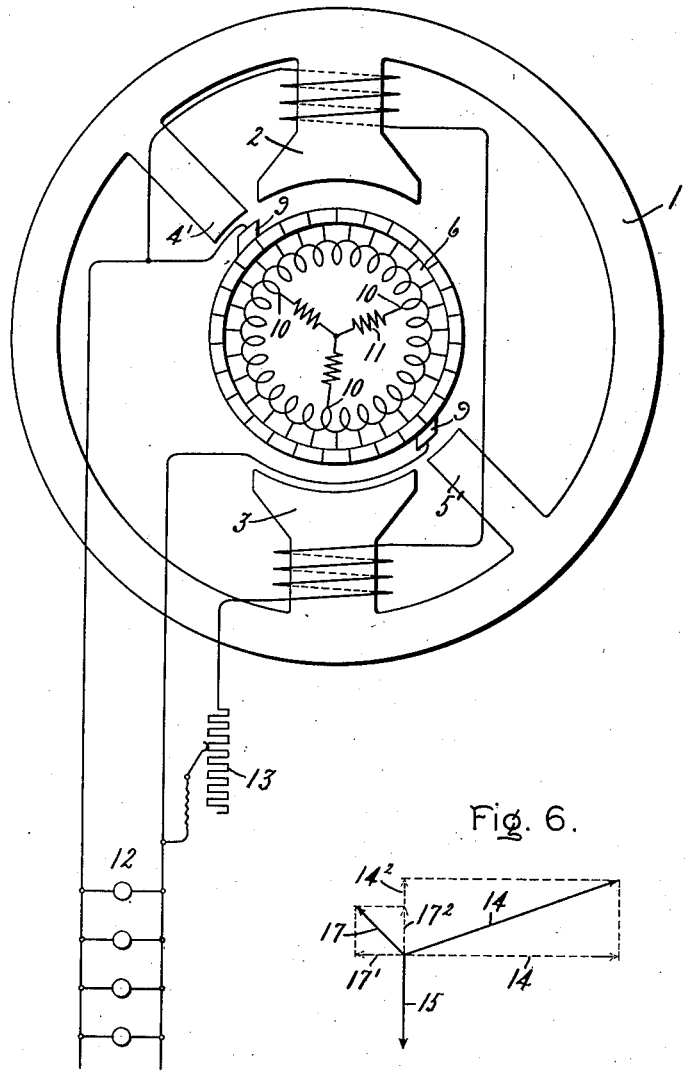
Figure 6:
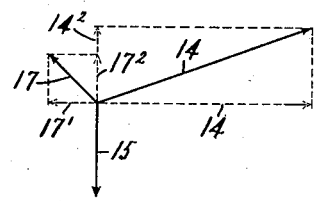

Figure 1 shows diagrammatically a dynamo in accordance with my invention; Fig. 2 shows a vector diagram of the fields for the same; Fig. 3 shows a modification of Fig. 1; Fig. 4 is a vector diagram for this modification; Fig. 5 is another modification of my invention; and Fig. 6 is a vector diagram showing the relation of the fields described in Fig. 5.

Referring first to Fig. 1, I have shown a frame, to which are attached poles 2, 3, 4 and 5. Revolving within these poles I have shown diagrammatically an armature 6, consisting of a winding 7 and a commutator 8. 9 are the commutator brushes. The armature is shown symbolically, as a Gramme-armature, and the commutator is shown external to the windings for the convenience of illustration; but it will be obvious that any of the well-known forms of winding may be used, and that while I have shown my invention as applied to a bipolar machine, this is only for the same purpose of convenience in illustration, as my invention may be applied to multipolar machines equally well. At points 10, which are shown as displaced from each other 120 electrical degrees, the armature is short-circuited through connections $10^1$ which produce a polyphase short-circuit upon it. Inserted in these connections are shown impedances 11, but if desired, these impedances may be omitted. While for the purposes of illustration a three-phase short-circuit is shown on the armature, any polyphase short-circuit may be used if desired. The commutator brushes 9 are shown as feeding translating devices 12. Poles 2 and 3 produce a field which is called for the purpose of convenience the "initial field," and these poles are excited by a shunt winding in series with which is an adjustable resistance 13. Poles 4 and 5 are excited by the series winding and are displaced 90 degrees from the initial field. The commutator brushes 9 are shown in a position to produce an armature reaction, which shall be in line with the field produced by the shunt winding upon the poles 2 and 3. The poles 2 and 3 are shown as having a small section cut out over the brushes for the purpose of commutation, but it is obvious that this is not essential for operation.

Referring now to Fig. 2, if the direction of the initial field of poles 2 and 3 be represented by the arrow 15, the voltage induced in the armature by this field, which is at right angles to the direction of the field, will be in the direction of the arrow $14^1$. If the current flowing through the short-circuiting connections were in phase with the voltage induced in the armature by the initial field, this current, or rather, the direction of its magneto-motive force, will also be in the direction indicated by $14^1$. If, on the other hand, the circuit formed by the armature winding and short-circuiting connections were wholly inductive instead of non-inductive, so that the current in these connections lagged 90° behind the induced voltage, the current in these connections and its magneto-motive force would be substantially in opposition to the direction of the initial field 15. If, however, the circuit formed by the short-circuiting connections and the impedances therein is partly inductive and partly non-inductive, the current in these connections and the direction of its magneto-motive force may be represented by the arrow 14. This magneto-motive force may be resolved into two components $14^1$ and $14^2$. Component $14^1$ is displaced 90° from the initial field and, consequently, from the line of the commutator brushes, and this component is the cross field which induces the voltage between the commutator brushes. The field produced by poles 4 and 5 is shown by vector 16, and the direction of this field is such as to oppose the component $14^1$ of the polyphase short-circuit field 14. The other component of the vector 14, $14^2$ opposes the direction of the initial field 15. The armature reaction is shown by vector 17 opposing the initial field 15, but being in the same direction as the component of the polyphase short-circuit field $14^2$.

The action of the machine for producing a constant output will then be as follows:— If the machine is feeding an external circuit under such conditions that the vectorial relation shown by Fig. 2 exists, when the resistance of the circuit is cut down, the current will tend to increase. This produces two effects, both of which decrease the voltage at the commutator brushes. In the first place the armature reaction in the line of the commutator brushes, represented in Fig. 2 by 17, increases, thereby weakening the initial field and, consequently, reducing the current produced in the short-circuited connections and its magneto-motive force indicated by the arrow 14. Furthermore, the increased current in the coils on poles 4 and 5 increases the magneto-motive force in these poles, indicated by 16, Fig. 2, and this increased magneto-motive force still further weakens the component $14^1$ of the cross field which induces the voltage between the commutator brushes. Thus by proper proportioning of parts a machine of substantially constant output can be produced. Also by a proper proportioning of parts a machine of an approximately constant current independent of the speed and the load may be produced. The polyphase current flowing in the polyphase short-circuit in the armature is dependent upon the impedence of the armature. When the speed of revolution of the armature increases, the reactance in the polyphase short-circuit also increases. The result is that the polyphase field is practically independent of the speed. If the initial field is given a constant excitation and the armature reaction is a strong one, the current will be substantially constant and independent of the load and the speed, for we may consider vector 14 as approximately constant, vector 15 as constant. Vectors 16 and 17 would tend to increase for an increase of speed, but any such increase would tend to decrease the resultant initial and cross fields. Thus the current will be approximately constant.

Referring now to Fig. 3, I have shown a modification of Fig. 1. This modification consists in omitting the series winding upon the poles 4 and 5. The vector diagram for this modification is shown in Fig. 4, and it is substantially similar to that of Fig. 2, with the exception that vector 16 is omitted. The poles 4 and 5 are used in order to assist the flux produced by the polyphase short-circuit.

In Fig. 5 I have shown a still further modification of Fig. 1. The modification consists in omitting poles 4 and 5 and employing auxiliary poles $4^1$ and $5^1$, which are displaced at an angle less than 90 degrees from the poles producing the initial field. Brushes 9 are displaced so as to produce an armature reaction in line with the poles $4^1$ and $5^1$, and these poles are used so as to decrease the reluctance in the path of the flux due to the armature reaction. Fig. 6 shows a vector diagram for this arrangement, where 17 is the field produced by the armature reaction. This field may be resolved into two components $17^1$ and $17^2$, $17^1$ tending to oppose the component $14^1$ of the field due to the polyphase short-circuit, and $17^2$ tending to oppose the initial field. It will be seen that the action of this modification of my invention is similar to the action of the embodiment shown in Fig. 1, as the shifting of the brushes to produce an armature reaction displaced in line from the line of the initial field merely produces a vector diagram similar to that shown in Fig. 2, the component $17^1$ of the armature reaction being similar to component 16 due to the series field. When the armature is short-circuited, or the resistance is greatly decreased, the armature reaction 17 will increase, and thus each of its components will increase, and the output will be substantially constant.

While I have shown certain forms or arrangements of embodiments of my invention, I do not limit myself to these forms or arrangements, but seek in the appended claims to cover all forms and arrangements which are within the scope of my invention, and which will be obvious to those skilled in the art.

What I claim as new and desire to secure by Letters Patent of the United States, is,

1. In an electric machine, the combination of field coils and connections for producing a unidirectional initial field, an armature having a commutator revolving within the field, and a plurality of connections on the armature winding short-circuiting the winding and forming paths for the current induced in the armature which produces in the armature a field angularly displaced from the initial field.

2. In an electric machine, the combination of field coils and connections for producing a unidirectional initial field, an armature having a commutator revolving within the field, commutator brushes and connections feeding a circuit, and means revolving with the armature producing a polyphase short-circuit on the armature.

3. In an electric machine, the combination of field coils and connections for producing a unidirectional initial field, an armature having a commutator revolving within the field, commutator brushes placed to produce an armature reaction in a direction parallel to the initial field and connections feeding a circuit, and means revolving with the armature producing a three-phase short-circuit on the armature.

4. In an electric machine, the combination of field coils and connections for producing a unidirectional initial field, an armature having a commutator revolving within the field, commutator brushes and connections feeding a circuit, and impedances and connections therefor forming a polyphase short-circuit on the armature.

5. In an electric machine, the combination of a set of field poles, field coils and connections therefor for producing in said poles a unidirectional initial field, a second set of field poles angularly displaced therefrom, an armature having a commutator revolving within the field poles, and connections on the armature revolving with it, and forming a path for the current induced in the armature which produces in the armature a field angularly displaced from the initial field.

6. In an electric machine, the combination of a set of field poles, field coils and connections for producing in said poles a unidirectional initial field, a second set of field poles angularly displaced therefrom, an armature having a commutator revolving within the field poles, and means producing a polyphase short-circuit on it.

7. In an electric machine, the combination of a set of field poles, coils and connections for producing in said poles a unidirectional initial field, a second set of field poles angularly displaced therefrom, an armature having a commutator revolving within the field poles, and means revolving with the armature producing a three-phase short-circuit on it.

8. In an electric machine, the combination of a set of field poles, coils and connections for producing in said poles an initial field, a second set of field poles displaced ninety degrees therefrom, an armature having a commutator revolving within the field poles, commutator brushes placed to produce an armature reaction in a direction parallel to that of the initial field, and connections revolving with the armature producing a polyphase short-circuit on it.

9. In an electric machine, the combination of a set of field poles, a shunt winding thereon and connections for producing in said poles an initial field, a second set of field poles displaced ninety degrees therefrom, an armature having a commutator revolving within the field poles, commutator brushes placed to produce an armature reaction in a direction parallel to that of the initial field, and connections revolving with the armature producing a polyphase short-circuit on it.

10. In an electric machine, the combination of a set of field poles, a shunt winding thereon and connections for producing in said poles an initial field, a second set of field poles displaced ninety degrees therefrom, an armature having a commutator revolving within the field poles, commutator brushes placed to produce an armature reaction in a direction opposed to that of the initial field, a series winding on the second set of field poles, and connections revolving with the armature producing a three-phase short-circuit upon it.

In witness whereof, I have hereunto set my hand this twelfth day of January, 1909.

LOUIS E. UNDERWOOD.

Witnesses:
JOHN A. McMANUS, Jr.,
CHARLES A. BARNARD.